(12) United States Patent
Sampson

(10) Patent No.: US 10,989,108 B2
(45) Date of Patent: Apr. 27, 2021

(54) METHODS AND SYSTEMS FOR A VARIABLE COMPRESSION ENGINE

(71) Applicant: Ford Global Technologies, LLC, Dearborn, MI (US)

(72) Inventor: Alan Sampson, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 16/051,206

(22) Filed: Jul. 31, 2018

(65) Prior Publication Data

US 2020/0040815 A1   Feb. 6, 2020

(51) Int. Cl.
| | | |
|---|---|---|
| *F02B 75/04* | (2006.01) | |
| *F16C 9/02* | (2006.01) | |
| *F16C 3/28* | (2006.01) | |
| *F02D 15/02* | (2006.01) | |

(52) U.S. Cl.
CPC ............ *F02B 75/047* (2013.01); *F02D 15/02* (2013.01); *F16C 3/28* (2013.01); *F16C 9/02* (2013.01)

(58) Field of Classification Search
CPC .......... F02B 75/047; F02D 15/02; F16C 3/28; F16C 9/02
USPC ......................................................... 123/48
See application file for complete search history.

(56) References Cited

U.S. PATENT DOCUMENTS

| | | | | |
|---|---|---|---|---|
| 1,987,661 A * | 1/1935 | Blauvelt | .................... | F16C 3/28 74/602 |
| 2,427,668 A * | 9/1947 | Gill | ....................... | F02B 75/045 123/48 B |
| 4,319,498 A * | 3/1982 | McWhorter | ............ | F02B 41/04 123/197.4 |
| 4,406,256 A * | 9/1983 | Akkerman | ............ | F02B 75/048 123/197.1 |
| 4,687,348 A * | 8/1987 | Naruoka | ............... | F02B 75/044 123/48 B |
| 5,172,983 A * | 12/1992 | Landrum | .............. | F02B 75/047 123/48 B |
| 5,406,911 A * | 4/1995 | Hefley | .................. | F02B 75/045 123/48 B |
| 5,562,068 A * | 10/1996 | Sugimoto | ............. | F02B 75/045 123/197.4 |
| 5,595,146 A | 1/1997 | Bollig et al. | | |
| 5,960,750 A * | 10/1999 | Kreuter | ................. | F02B 75/045 123/48 B |
| 6,491,003 B2 | 12/2002 | Moteki | | |
| 6,505,582 B2 | 1/2003 | Moteki et al. | | |
| 6,510,822 B2 | 1/2003 | Weiss | | |
| 6,662,768 B2 * | 12/2003 | Boyer | ................. | F02D 13/0234 123/316 |
| 6,665,605 B2 * | 12/2003 | Boyer | ....................... | F01L 1/34 123/78 E |

(Continued)

FOREIGN PATENT DOCUMENTS

| | | | | | |
|---|---|---|---|---|---|
| JP | 2004346848 A | * | 12/2004 | ............. | F02D 15/02 |
| JP | 2015124638 A | * | 7/2015 | ............. | F02D 75/04 |
| WO | WO2015179112 A1 | * | 11/2015 | ............. | F02B 75/04 |

*Primary Examiner* — Hung Q Nguyen
*Assistant Examiner* — Anthony Donald Taylor, Jr.
(74) *Attorney, Agent, or Firm* — Geoffrey Brumbaugh; McCoy Russell LLP

(57) ABSTRACT

Methods and systems are provided for adjusting a compression ratio. In one example, a system may include rotating an eccentric ring of a crankshaft by flowing hydraulic fluid to first and second chambers to actuate the eccentric ring.

20 Claims, 9 Drawing Sheets

(56) References Cited

U.S. PATENT DOCUMENTS

| | | | | |
|---|---|---|---|---|
| 6,705,255 | B2* | 3/2004 | Papaioannou | F02B 75/04 |
| | | | | 123/48 R |
| 6,732,683 | B2 | 5/2004 | Weiss | |
| 6,984,070 | B2* | 1/2006 | Sugimura | F02F 7/0053 |
| | | | | 123/195 R |
| 8,646,420 | B2* | 2/2014 | Lee | F02D 15/02 |
| | | | | 123/48 B |
| 8,776,736 | B2* | 7/2014 | Woo | F02B 75/045 |
| | | | | 123/48 A |
| 9,574,495 | B2* | 2/2017 | Matsuda | F02B 75/048 |
| 10,161,440 | B2* | 12/2018 | Kim | F02B 75/045 |
| 10,344,669 | B2* | 7/2019 | Tomoda | F16C 3/28 |
| 2002/0043229 | A1* | 4/2002 | Yapici | F02B 75/047 |
| | | | | 123/78 F |
| 2005/0150471 | A1* | 7/2005 | Styron | F16C 7/06 |
| | | | | 123/48 B |
| 2015/0260094 | A1* | 9/2015 | Wittek | F02B 75/045 |
| | | | | 123/48 B |
| 2017/0097037 | A1* | 4/2017 | Numidi | F16C 3/06 |
| 2017/0167370 | A1* | 6/2017 | Choi | F02B 75/048 |
| 2017/0241333 | A1* | 8/2017 | Roth | F02B 75/04 |
| 2017/0284455 | A1* | 10/2017 | Kim | F16J 1/16 |

\* cited by examiner

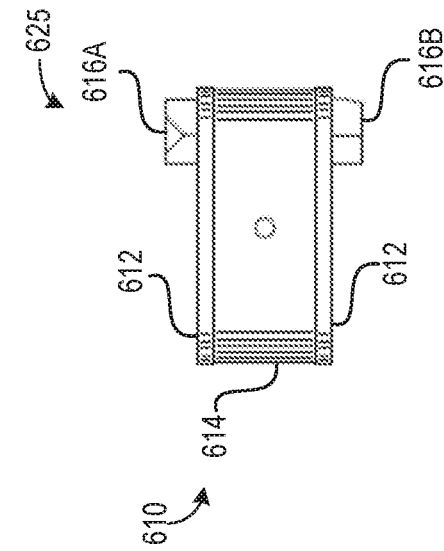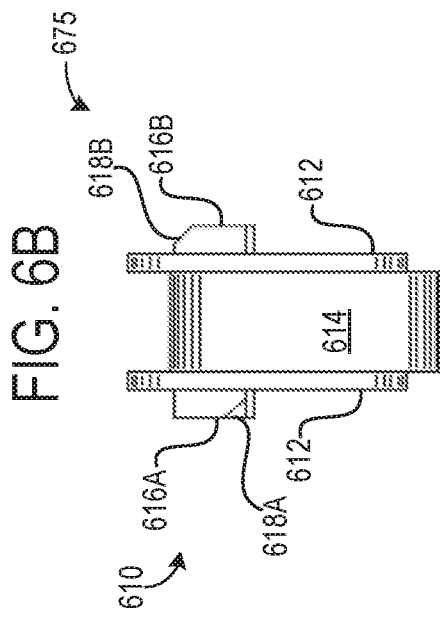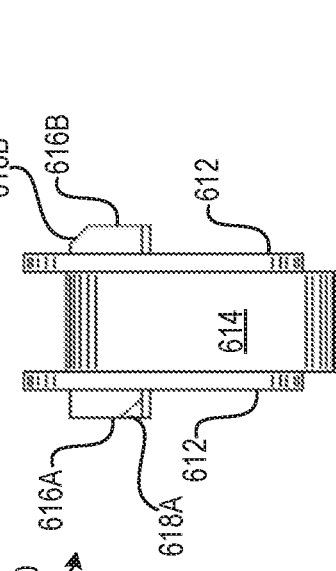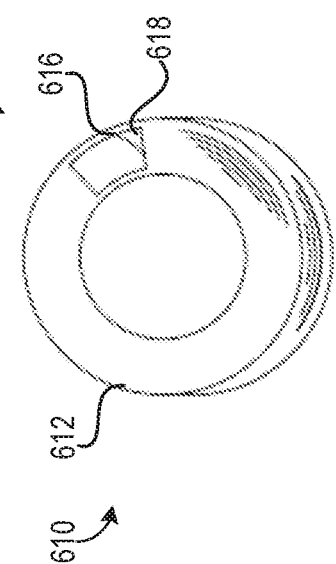

METHODS AND SYSTEMS FOR A VARIABLE COMPRESSION ENGINE

FIELD

The present description relates generally to adjusting a compression ratio of an engine.

BACKGROUND/SUMMARY

As emissions standards become increasingly strict, manufacturers are looking for ways to decrease emissions while maintain or increasing vehicle power output. One such approach in gasoline engines may include variable compression engines. Therein, a compression ratio may be adjusted to increase fuel efficiency while maintaining or increasing torque.

One example approach is shown by Moteki et al. in U.S. Pat. No. 6,505,582. Therein, a variable compression ratio mechanism includes an upper link coupled at one end of a piston pin and a lower link connecting the other end of the upper link to a crankpin. The variable compression ratio further comprises a control link, which is shaped to adjust an angle of the lower link. By adjusting an angle of the lower link, the crankpin orientation is correspondingly adjusted and the compression ratio is adjusted. The control link is oscillatingly supported via an eccentric cam fixed to a control shaft which is rotated via a compression-ratio control actuator.

However, the inventors herein have recognized potential issues with such systems. As one example, energy losses may incur in response to an inaccurate inclination angle of the upper link. Therefore, the compression ratio mechanism of Moteki is entirely dependent on the various mechanical components rotating exactly as desired for substantially energy losses to be prevented. Additionally, if the desired inclination angle is not reached, then piston thrust face (between the cylinder wall and the piston) may increase and piston slapping noise may increase. These mechanical components and gears are arranged in an environment have high temperatures and high mechanical stress, which may lead to degradation. That is to say, the convoluted make-up of the variable compression ratio, which relies on the compression-ratio control actuator to actuate the control link, which actuates the lower link, which actuates the crankpin, to finally adjust the upper link angle to adjust the compression ratio comprises many different pieces which may degrade and inhibit the domino effect of this Rube Goldberg-type device.

In one example, the issues described above may be addressed by a system comprising a crankshaft eccentric ring comprising a first protrusion and a second protrusion rotated by hydraulic fluid in one or more of a first chamber and a second chamber. In this way, a number of components used to adjust the compression ratio may be reduced relative to other examples.

As one example, the first and second protrusions may be arranged on opposite sides of the eccentric ring. The first and second chambers may be arranged in first and second counterweights flanking the eccentric ring, wherein the first protrusion is arranged in the first chamber and the second protrusion is arranged in the second chamber. Hydraulic fluid may flow into the first and second chambers, wherein the first and second chambers may be shaped such that they are filled with hydraulic fluid in opposite directions relative to one another. Thus, hydraulic fluid in the first and second chambers may press against the first and second protrusions in opposite directions to adjust a compression ratio of the engine. Furthermore, an amount of hydraulic fluid flowing to the first and second chambers may be adjusted so that a highest compression ratio, a lowest compression ratio, and compression ratios therebetween may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 6A, 6B, 6C, and 6D illustrate perspective, top, front, and side views of the eccentric ring, respectively.

FIGS. 2-8B are shown approximately to scale.

DETAILED DESCRIPTION

Figure 2:
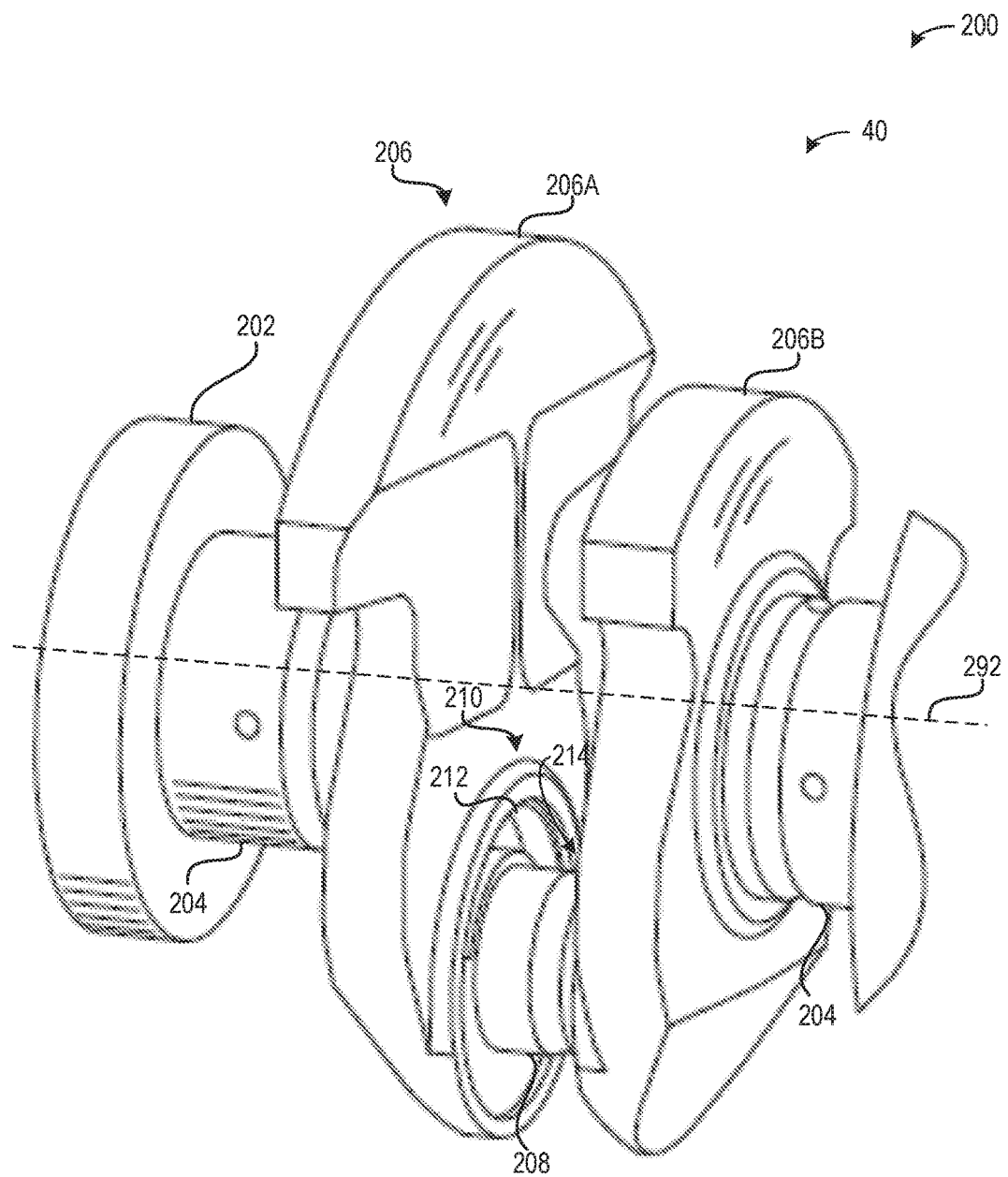
FIG. 2 illustrates a perspective view of a crankshaft having one or more components for adjusting a compression ratio.
Figure 3:
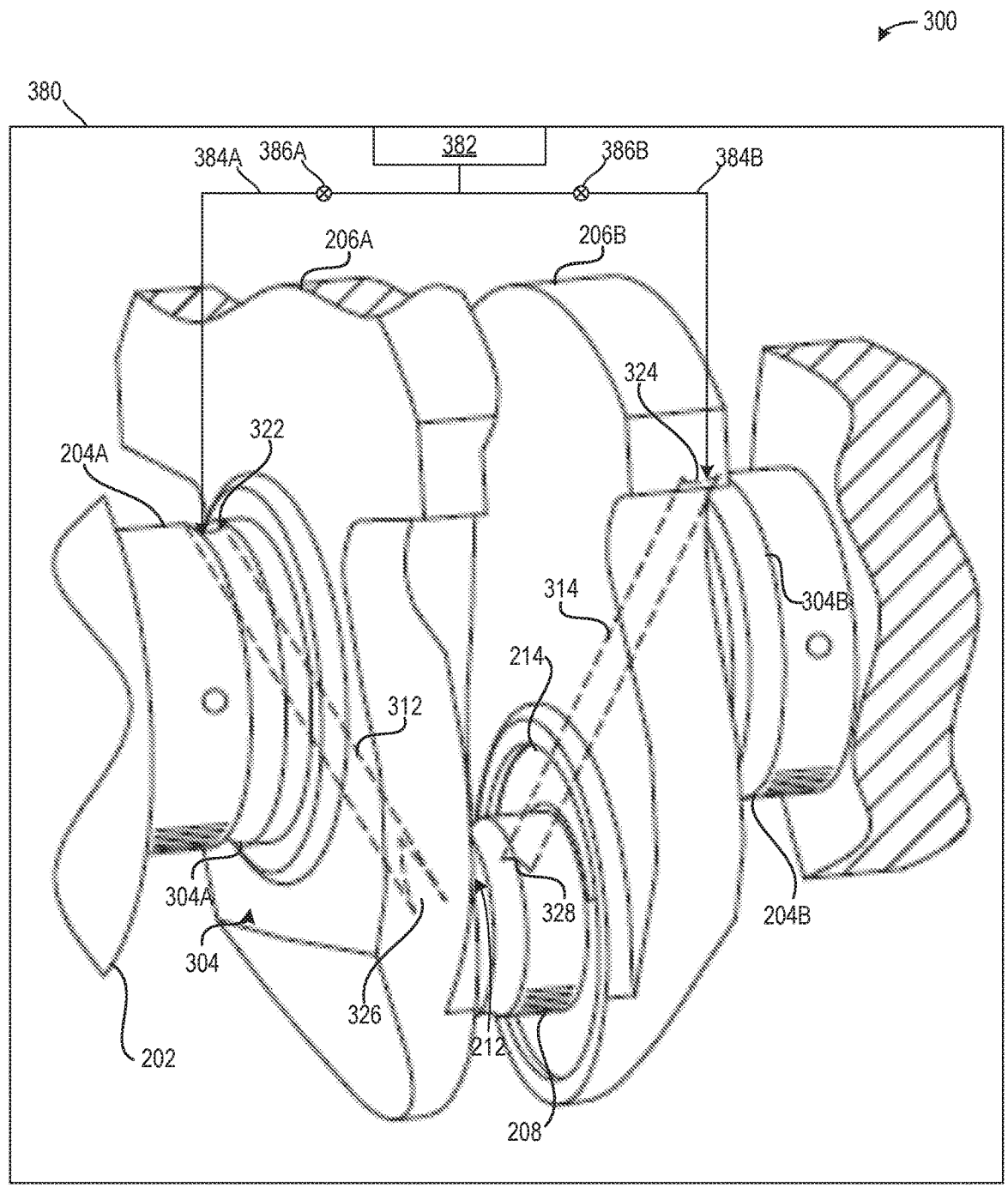
FIG. 3 illustrates internal passages fluidly coupling higher and lower compression chambers to a hydraulic fluid source in an engine block.
Figure 4:
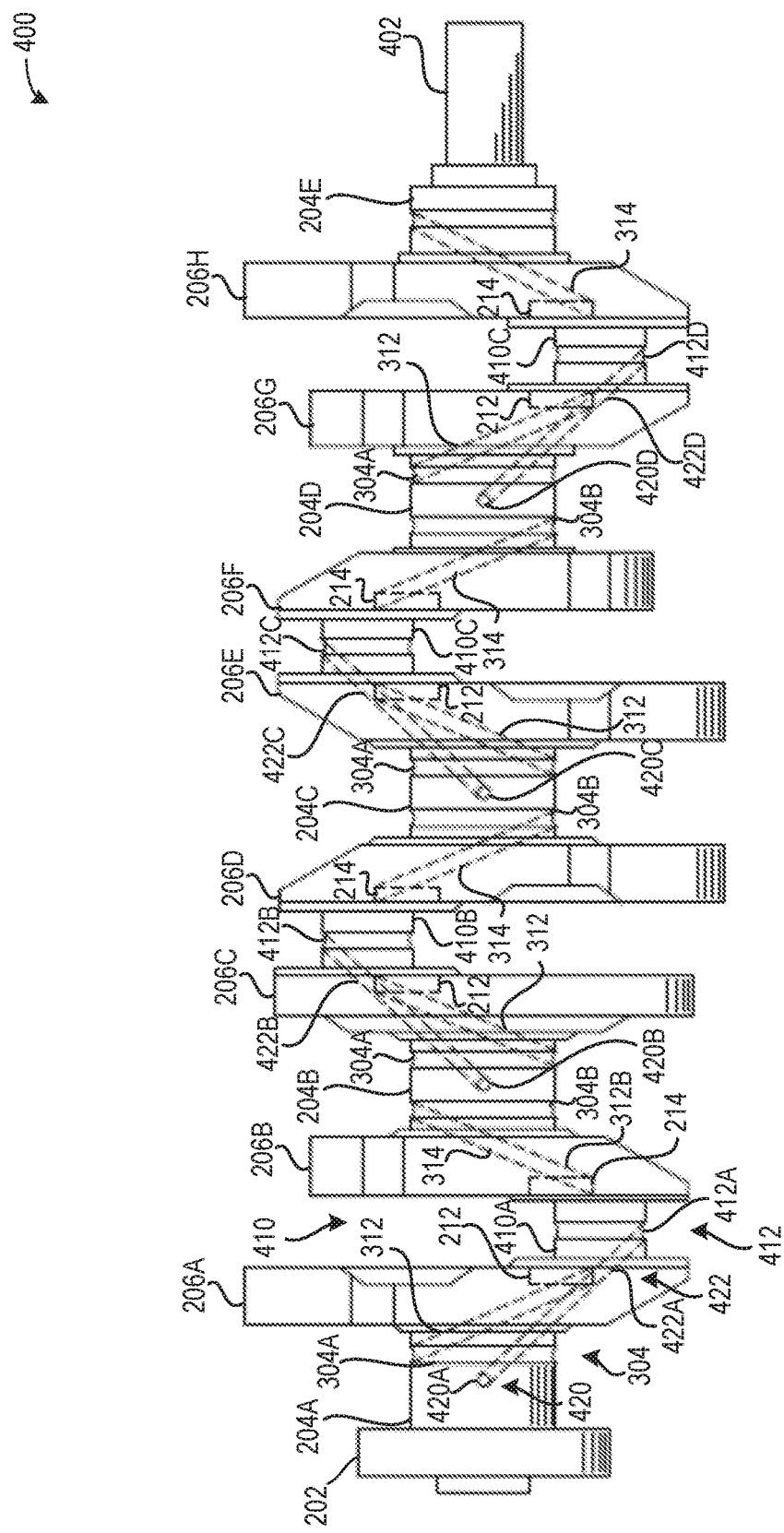
FIG. 4 illustrates each of the internal passages and lubrication ports of the crankshaft.
Figure 5:
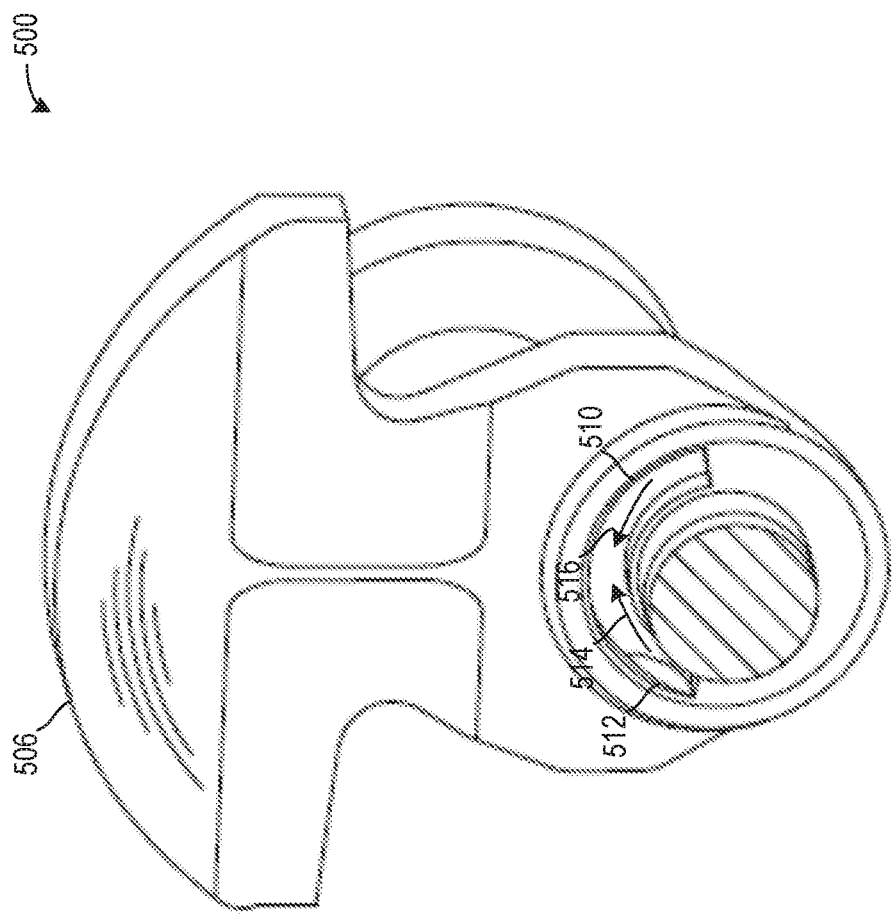
FIG. 5 illustrates a face-on view of a higher compression chamber of the crankshaft.
Figure 7A:
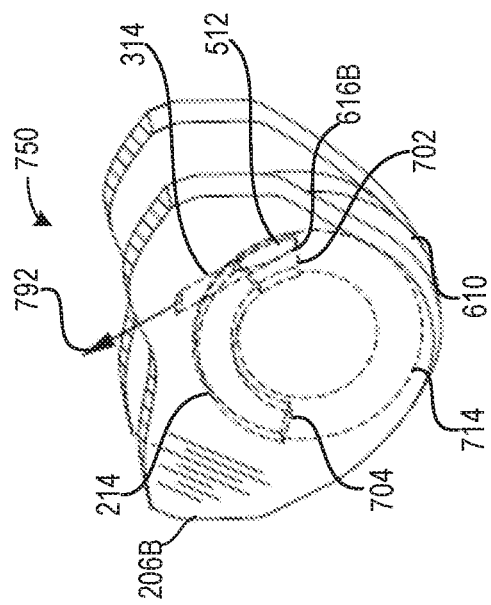
FIGS. 7A and 7B illustrate a flow of hydraulic fluid during a higher compression state.
Figure 7B:
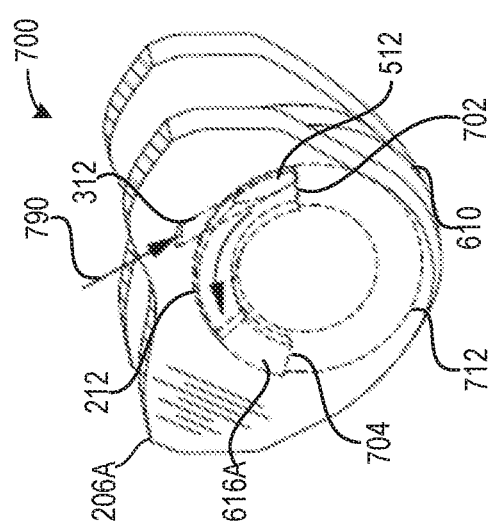
Figure 8A:
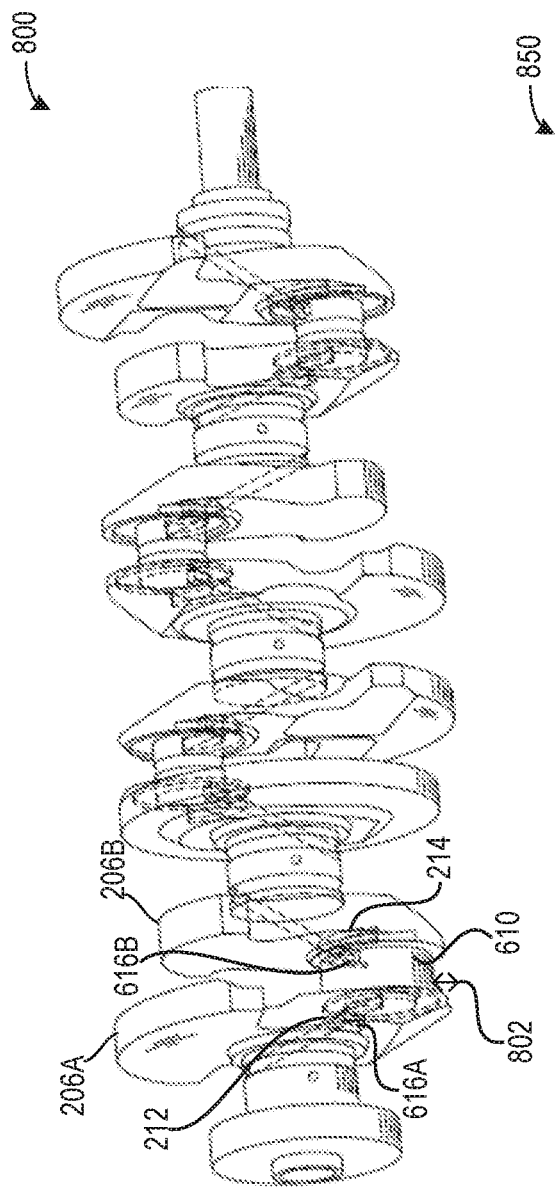
FIGS. 8A and 8B illustrate positions of an eccentric arranged on a crankshaft to achieve low and high compression states, respectively.
Figure 8B:
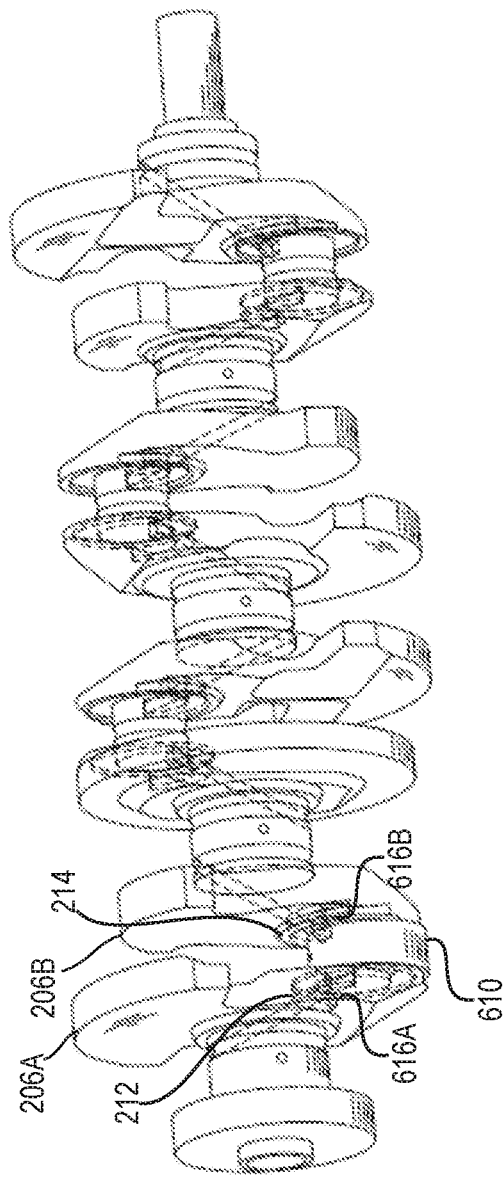
Figure 9:
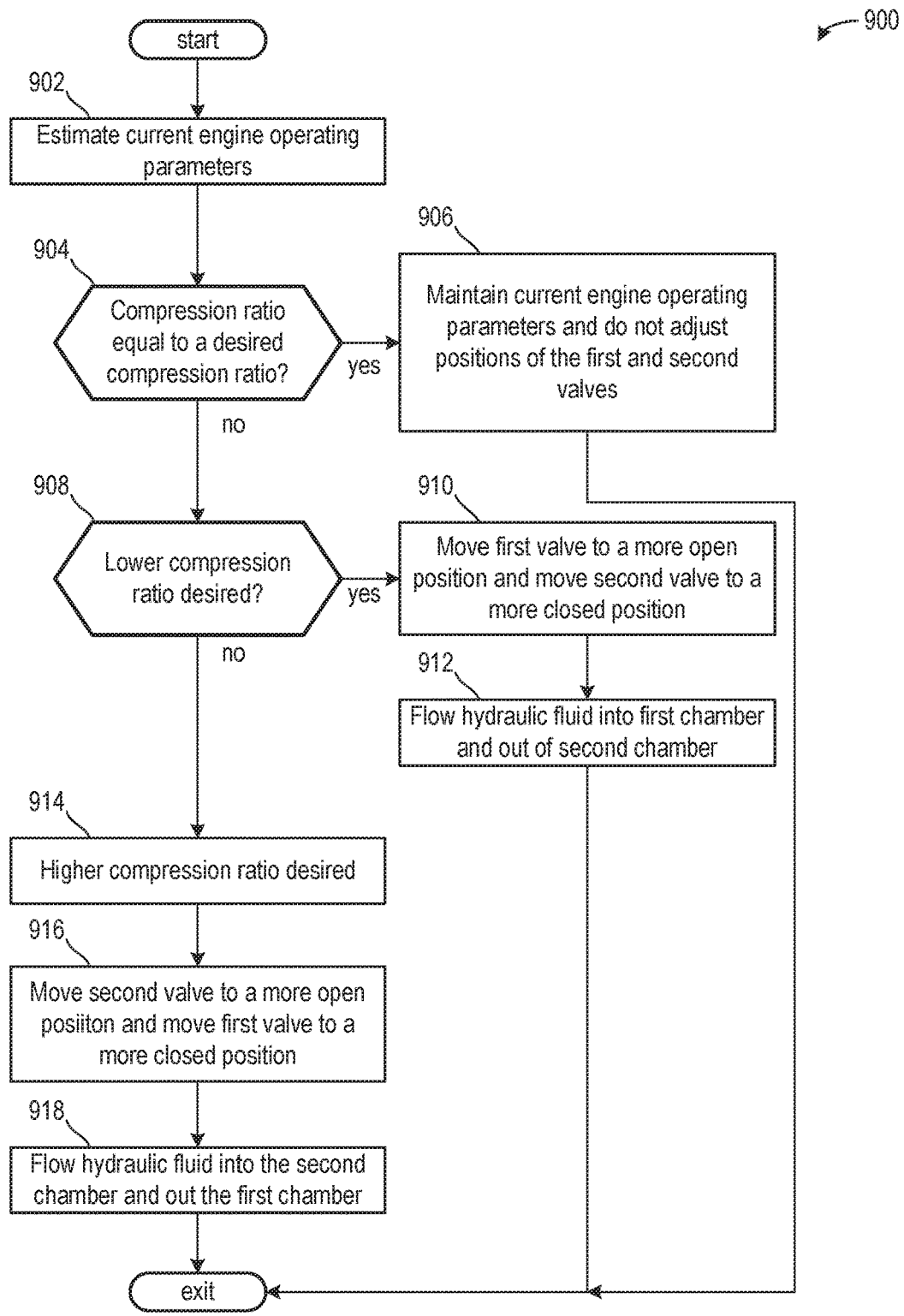
FIG. 9 illustrates a method for adjusting hydraulic fluid flow to the higher and lower compression chambers based on engine operating conditions to achieve a desired compression ratio.

The following description relates to systems and methods for a variable compression engine. The engine may be included in a hybrid vehicle, such as the hybrid vehicle of FIG. 1. The compression ratio may be adjusted via one or more components of a crankshaft, as shown in FIG. 2. Therein, the components may include compression chambers configured to receive hydraulic fluid from a hydraulic fluid source, as shown in FIG. 3. One of the chambers may correspond to higher compression ratios and the other may correspond to lower compression ratios. A plurality of internal passages may be arranged within the crankshaft for fluid flow, as shown in FIG. 4. A compression chamber may be fitted into a body of a counterweight, as shown in FIG. 5. FIGS. 6A, 6B, 6C, and 6D illustrate various views of an eccentric ring. FIGS. 7A and 7B illustrate a flow of hydraulic fluid from the chambers during a higher compression state. FIGS. 8A and 8B illustrate different orientations of the eccentric ring during higher and lower compression states. FIG. 9 illustrates a method for adjusting hydraulic fluid flow to the higher and lower chambers to achieve a desired compression ratio.

FIGS. 1-8B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIGS. 5, 7A, and 7B show arrows indicating where there is space for gas and/or liquid to flow, and the solid lines of the device walls show where flow is blocked and communication is not possible due to the lack of fluidic communication created by the device walls spanning from one point to another. The walls create separation between regions, except for openings in the wall which allow for the described fluid communication.

Figure 1:
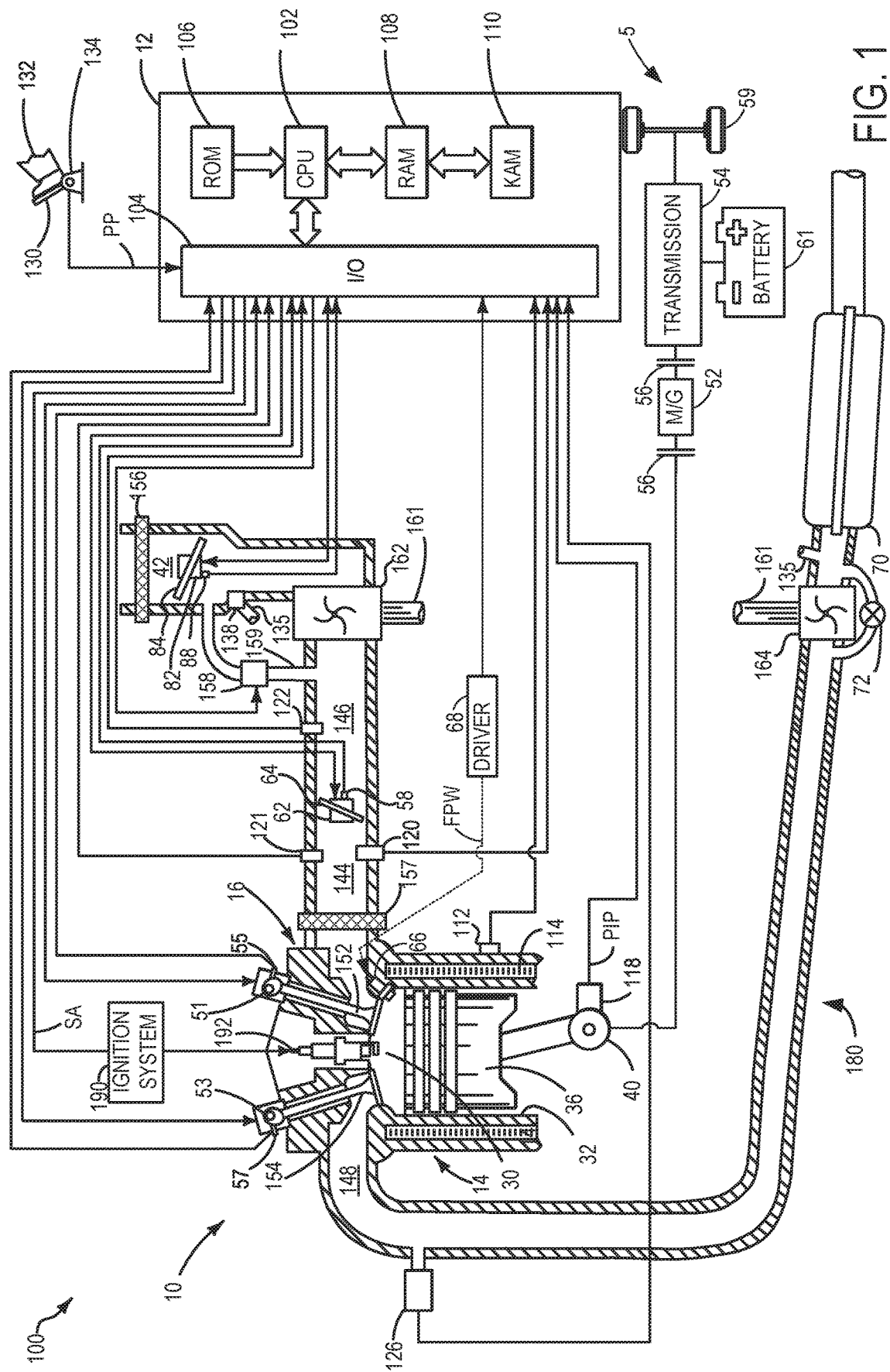
FIG. 1 illustrates an engine included in a hybrid vehicle.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressure can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112.

The controller 12 receives signals from the various sensors of FIG. 1 and employs the various actuators of FIG. 1 to adjust engine operation based on the received signals and instructions stored on a memory of the controller. For example, adjusting a variable compression ratio of the engine 10 may include adjusting an actuator of one or more valves arranged in an engine block to adjust a flow of hydraulic fluid to the crankshaft, as will be described in greater detail below.

Turning now to FIG. 2, it shows an embodiment 200 of the crankshaft 40 comprising one or more chambers shaped to receive hydraulic fluid from a hydraulic fluid source in the engine block. By adjusting a flow of hydraulic fluid to the crankshaft 40, a compression ratio of the engine (e.g., engine 10 of FIG. 1) may be adjusted to increase an efficiency of the engine through a variety of engine loads. Adjusting the compression ratio may include adjusting a height and/or orientation of a piston (e.g., piston 36 of FIG. 1) such that a volume of a combustion chamber (e.g., combustion chamber 30) is reduced. More specifically, a lower compression ratio may correspond to higher engine loads where the volume of the combustion chamber is reduced and a higher compression ratio may correspond to lower engine loads where the volume of the combustion chamber is increased. The lower compression ratio may further comprise a vertically lower top-dead-center (TDC) and a vertically higher bottom-dead-center (BDC) compared to the higher compression ratio.

An axis system 290 comprising three axes, namely an x-axis parallel to a horizontal direction, a y-axis parallel to a vertical direction, and a z-axis perpendicular to each of the x- and y-axes is shown. An axis of rotation 292 is shown extending through a center of the crankshaft 40 parallel to the x-axis about which portions of the crankshaft 40 physically coupled to a connecting rod may eccentrically rotate.

The crankshaft 40 comprises a flywheel flange 202 which may be arranged at an extreme end of the crankshaft 40. The flywheel flange 202 may comprise a shallow recess for aligning it with a flanged end of the crankshaft 40 to provide radial support. The flywheel flange 202 may dampen speed fluctuations of the crankshaft and store energy to consume during idle or other loads in a manner known by those of ordinary skill in the art.

The crankshaft 40 further comprises a plurality of main bearing journals 204. In some examples, the plurality of main bearing journals 204 may comprise at least two main bearing journals 204, each of the main bearing journals 204 arranged adjacent to extreme ends of the crankshaft 40. Additionally or alternatively, as in the example illustrated in FIG. 2, a number of main bearing journals 204 may be equal to or greater than a number of crankpins, the number of crankpins being equal to a number of pistons and/or cylinders.

The main bearing journals 204 may be arranged on the crankshaft 40 such that the axis of rotation 292 may pass through a center of the main bearing journals 204 for all positions of the crankshaft 40. In this way, the main bearing journals 204 may rotate, but not eccentrically, about the axis of rotation 292.

A plurality of counterweights 206 may be arranged on the crankshaft 40 to balance forces acting on the crankshaft 40, thereby mitigating degradation (e.g., bending) of the crankshaft 40. A number of counterweights 206 may be equal to or greater than the number of crankpins. In one example, such as the example of FIG. 2, a number of counterweight 206 may be twice a number of crankpins.

Each counterweight of the counterweights 206 may comprise a fluid chamber 210 arranged on a side of the counterweight facing a rod bearing journal 208. More specifically, the rod bearing journal 208 may be sandwiched by a pair of counterweights 206 including a first counterweight 206A and a second counterweight 206B. The first counterweight 206A may comprises a first chamber 212 and the second counterweight 206B may comprise a second chamber 214 occluded from view in the example of FIG. 2. The first chamber 212 and the second chamber 214 may be shaped to receive hydraulic fluid from a hydraulic fluid source of the engine block, wherein flowing hydraulic fluid to the first and second chambers may adjust an orientation of an eccentric ring arranged on the rod bearing journal 208. The eccentric ring is described in greater detail with respect to FIGS. 6A-8B.

Turning now to FIG. 3, it shows an embodiment 300 illustrating a relationship between notches 304 arranged in the main bearing journals 204 and the first and second chambers 212, 214. More specifically, a first internal passage 312 may fluidly couple the first chamber 212 to a first notch 304A of a first main bearing journal 204A of the main bearing journals 204. A second internal passage 314 may fluidly couple the second chamber 214 to a second notch 304B of a second main bearing 204B.

The first and second chambers 212, 214 may be substantially identical in size and shape. Additionally or alternatively, the first and second chambers 212, 214 may be arranged directly across from one another about the x-axis parallel to the axis of rotation (e.g., axis of rotation 292). The first internal passage 312 comprises a first opening 322 and a second opening 326.

The first opening 322 of the first internal passage 312 may be fluidly coupled to the first notch 304A, where the first opening may be shaped to flow hydraulic fluid to or away from the first notch 304A. The second opening 326 of the first internal passage 312 may be fluidly coupled to the first chamber 212, where the second opening may be shaped to flow hydraulic fluid to or away from the first chamber 212.

Similarly, the second internal passage 314 comprises a first opening 324 and a second opening 328. The first opening 324 of the second internal passage 314 may be fluidly coupled to the second notch 304B, wherein the second opening may be shaped to flow hydraulic fluid to or away from the second notch 304B. The second opening 328 of the second internal passage 314 may be fluidly coupled to the second chamber 214, where the second opening may be shaped to flow hydraulic fluid to or away from the second chamber 214.

While the first openings 322, 324 may be oriented in similar radial directions such that the first openings 322, 324 are aligned along a single axis parallel to the x-axis, the second openings 326, 328 may be misaligned relative to the x-axis. More specifically, the second openings 326, 328 may be radially misaligned such that an angle associated with the misalignment corresponds to an arc length of the first and second chambers 212, 214. Said another way, the second openings 326, 328 are fluidly coupled to opposite extreme ends of the first and second chambers, respectively. In this way, hydraulic fluid fills the first and second chambers 212, 214 in opposite directions. This is further illustrated and described with respect to FIGS. 8A and 8B.

In this way, the first chamber 212 and the second chamber 214 may be arranged on the first counterweight 206A and the second counterweight 206B, respectively. The first and second counterweights 206A, 206B may sandwich a single rod bearing journal, toward which the first and second chambers 212, 214 are oriented. A notch of a main bearing journal nearest the first counterweight 206A may be fluidly coupled to the first chamber 212. A notch of a main bearing journal nearest the second counterweight 206B may be fluidly coupled to the second chamber 214. Thus, the first and second chambers 212, 214 facing the same rod bearing journal 208 may not be fluidly coupled to notches arranged on a shared main bearing journal. That is to say, the internal passages leading to first and second chamber 212, 214 facing the same rod bearing journal 208 extending from different notches of different main bearing journals.

The first internal passage 312 and the second internal passage 314 may receive hydraulic fluid from a hydraulic source 382 arranged in an engine block 380 of an engine (e.g., engine 10 of FIG. 1). The hydraulic source 382 may be an oil reservoir, crankcase oil sump, and/or some other source of hydraulic fluid. More specifically, the first internal passage 312 may receive hydraulic fluid from the hydraulic source via a first hydraulic source passage 384A when a first valve 386A is at least partially open. The second internal passage 314 may receive hydraulic fluid from the hydraulic source 382 via a second hydraulic source passage 384B when a second valve 386B is at least partially open. In some examples, the first valve 386A and the second valve 386B may be combined into a single valve, wherein the single valve is a spool-type valve in one example. At any rate, for a crankshaft comprising a plurality of first chambers and a plurality of second chambers, the first hydraulic source passage 384A may flow hydraulic fluid to each of the first chambers and the second hydraulic source passage 384B may flow hydraulic fluid to each of the second chambers based on positions of first and second valves 386A and 386B. A method for flowing hydraulic fluid to the first and second chambers is shown in FIG. 9.

In some embodiments, a crankshaft comprises a first group comprising an eccentric ring arranged between a first counterweight and a second counterweight, the first and second counterweights comprising first and second fluid chambers, respectively. The first and second fluids chambers configured to receive hydraulic fluid from first and second main journal bearings, respectively. The first main journal bearing being arranged adjacent to the first counterweight and the second main journal bearing being arranged adjacent to the second counterweight such that the main journal bearings sandwich the first and second counterweights. A first main journal bearing notch is shaped to receive hydraulic fluid from a first passage connecting it to a hydraulic fluid source, the first main journal bearing notch directing the hydraulic fluid to or away from the first chamber. A second main journal bearing notch is shaped to receive hydraulic fluid from a second passage connecting it to a hydraulic fluid source, the second main journal bearing notch directing the hydraulic fluid to or away from the second chamber. FIG. 4 illustrates an example of a crankshaft comprising multiple groups similar to the first group described.

Turning now to FIG. 4, it shows an embodiment 400 the crankshaft 40 and a plurality of passages arranged therein. In the example of the FIG. 4, the crankshaft 40 is shaped to convert reciprocal energy to rotational energy from four pistons. It should be appreciated that the embodiment 400 is merely one example of crankshaft 40 and that crankshaft 40 and its components described herein may be adjusted to fit other engines comprising different numbers of cylinders.

The plurality of main bearing journals 204 comprises five main bearing journals including the first main bearing journal 204A, the second main bearing journal 204B, a third main bearing journal 204C, a fourth main bearing journal 204D, and a fifth main bearing journal 204E. The second, third, and fourth main bearing journals 204B, 204C, and 204D may be substantially identical in shape. The first main bearing journal 204A, which is the closest to the flywheel flange 202, may differ from the other main bearing journals in that it comprises a single notch of the notches 304. Likewise, the fifth main bearing journal 204E, which is the closest to a pulley end 402 of the crankshaft 40, may differ from the other main bearing journals distal to extreme ends of the crankshaft 40 in that it also comprises only a single notch of the notches 304. In this way, the first and fifth main bearing journals 204A, 204E may be fluidly coupled to only one of the first and second chambers 212, 214 while the second, third, and fourth main bearing journals 204B, 204C, 204D may be fluidly coupled to each of the first and second chambers 212, 214. In this way, a number of main bearing journals may be equal to a number of crankpins and/or pistons plus one.

The first main bearing journal 204A comprises only the first notch 304A, which is fluidly coupled to the first chamber 212 of the first counterweight 206A via a first internal passage 312. The first main bearing journal 204A further comprises an oil port 420A of a plurality of oil ports 420 shaped to receive oil from an oil source in an engine block. In some examples, the hydraulic fluid may be oil such that the hydraulic fluid source and the oil source are the same. However, fluid in the oil port may not mix with fluid in the first notch 304A. Thus, fluid in the oil port 420A does not flow into the first chamber 212 or the second chamber 214.

The oil port 420A may feed oil to an oil passage 422A which may be shaped to flow the oil to an eccentric ring oil passage 412A. The oil in the eccentric ring oil passage 412A may coat a first eccentric ring 410A, of a plurality of eccentric rings 410, with oil. Oil from the oil passage 422A may function to lubricate the first eccentric ring 410A and may not be used to adjust a compression ratio of an engine by flowing to one or more of the first and second chambers 212, 214.

The first eccentric ring 410A may be sandwiched between the first and second counterweights 206A, 206B. The first eccentric ring 410A may comprise one or more features that may communicate with hydraulic fluid in the first and second chambers 212, 214 of the first and second counterweights 206A, 206B, respectively, to adjust a position of a piston. Features of the plurality of eccentric rings 410 are described in greater detail below.

The second main bearing journal 204B comprises the second notch 304B and the first notch 304A. The second notch 304B of the second main bearing journal 204B may be fluidly coupled to the second chamber 214 arranged in the second counterweight 206B corresponding to the first eccentric ring 410A. The first notch 304A of the second main bearing journal 204B may be fluidly coupled to the first chamber 214 arranged in a third counterweight 206C corresponding to a second eccentric ring 410B. As such, the second main bearing journal 204B, which is sandwiched between the second and third counterweights 206B, 206C, may be shaped to flow fluid to the second chamber 214 corresponding to the first eccentric ring 410A and to the first chamber 212 corresponding to a second eccentric ring 410B. As such, hydraulic fluid flow from the second main bearing journal 204B may adjust a compression ratio of two different cylinders. Furthermore, a combination of hydraulic flows from the first and second main bearing journals 204A, 204B may adjust a compression ratio of a first cylinder corresponding to the first eccentric ring 410A through a highest ratio, a lowest ratio, and ratios therebetween.

The second main bearing journal 204B further comprises an oil port 420B, which may direct oil into an oil passage 422B fluidly coupled to a second eccentric ring oil passage 412B. The second eccentric ring oil passage 412B may not mix oil with hydraulic fluid in the first and second chambers 212, 214.

The third main bearing journal 204C comprises the second notch 304B and the first notch 304A. The second notch 304B of the third main bearing journal 204C may be fluidly coupled to a second chamber 214 arranged in a fourth counterweight 206D corresponding to the second eccentric ring 410B. The first notch 304A of the third main bearing journal 204C may be fluidly coupled to the first chamber arranged in a fifth counterweight 206E corresponding to a third eccentric ring 410C. As such, the third main bearing journal 204C, which is sandwiched between the fourth and fifth counterweights 206D, 206E, may be shaped to flow fluid to the second chamber 214 corresponding to the second eccentric ring 410B and to the first chamber 212 corresponding to the third eccentric ring 410C. As such, hydraulic fluid flow from the third main bearing journal 204C may adjust a compression ratio of two different cylinders. Furthermore, a combination of hydraulic flows from the second and third main bearing journals 204B, 204C may adjust a compression ratio of a second cylinder corresponding to the second eccentric ring 410B through a highest ratio, a lowest ratio, and ratios therebetween.

The third main bearing journal 204C further comprises an oil port 420C, which may direct oil into an oil passage 422C fluidly coupled to a third eccentric ring oil passage 412C. The third eccentric ring oil passage 412C may not mix oil with hydraulic fluid in the first and second chambers 212, 214.

The fourth main bearing journal 204D comprises the second notch 304B and the first notch 304A. The second notch 304B of the fourth main bearing journal 204D may be fluidly coupled to a second chamber 214 arranged in a sixth counterweight 206F corresponding to the third eccentric ring 410C. The first notch 304A of the fourth main bearing journal 204D may be fluidly coupled to the first chamber arranged in a seventh counterweight 206G corresponding to a fourth eccentric ring 410D. As such, the fourth main bearing journal 204D, which is sandwiched between the sixth and seventh counterweights 206F, 206G, may be shaped to flow fluid to the second chamber 214 corresponding to the third eccentric ring 410C and to the first chamber 212 corresponding to the fourth eccentric ring 410D. As such, hydraulic fluid flow from the fourth main bearing journal 204D may adjust a compression ratio of two different cylinders. Furthermore, a combination of hydraulic flows from the third and fourth main bearing journals 204C, 204D may adjust a compression ratio of a third cylinder corresponding to the third eccentric ring 410C through a highest ratio, a lowest ratio, and ratios therebetween.

The fourth main bearing journal 204D further comprises an oil port 420D, which may direct oil into an oil passage 422D fluidly coupled to a fourth eccentric ring oil passage 412D. The fourth eccentric ring oil passage 412D may not mix oil with hydraulic fluid in the first and second chambers 212, 214.

The fifth main bearing journal 204E comprises only the second notch 304B and may not comprise the first notch 304A. As such, the first main bearing journal 204E may be shaped to flow hydraulic fluid to only the second chamber 214 arranged in an eighth counterweight 206H. Thus, a combination of hydraulic fluid flows from the fourth and fifth main bearing journals 204D, 204E may adjusted a compression ratio of a fourth cylinder corresponding to the fourth eccentric ring 410D through a highest ratio, a lowest ratio, and ratios therebetween.

In this way, the crankshaft 40 may comprise a number of eccentric rings 410 equal to a number of cylinders of the engine. Each eccentric ring of the eccentric ring 410 may be sandwiched by a pair of counterweights comprising first and second chambers. Main bearing journals nearest to and flanking and/or sandwiching the pair of counterweights may be fluidly coupled to the first and second chambers, wherein the main bearing journals optionally direct hydraulic fluid to and away from the first and second chambers to adjust a compression ratio to a highest compression ratio, a lowest compression ratio, or a compression ratio therebetween. For compression ratios between the highest and lowest compression ratio, each of the first and second chambers may comprise some amount of hydraulic fluid simultaneously to adjust an orientation of the eccentric ring. Thus, in one example, the first chamber may be a higher compression chamber and the second chamber may be a lower compression chamber, wherein hydraulic fluid in the first chamber orients the eccentric ring to an orientation that results in higher compression ratios and hydraulic fluid in the second chamber orients the eccentric ring to an orientation that results in lower compression ratios. As such, the first and second chamber may work in tandem during some engine loads to achieve compression ratios between the highest and lowest compression ratios. It will be appreciated that in some examples, the first chamber may be a lower compression chamber and the second chamber may be a higher compression chamber without departing from the scope of the present disclosure.

In some embodiments, a crankshaft comprises a first group comprising an eccentric ring arranged between a first counterweight and a second counterweight, the first and second counterweights comprising first and second fluid chambers, respectively. The first and second fluids chambers configured to receive hydraulic fluid from first and second main journal bearings, respectively. The first main journal bearing being arranged adjacent to the first counterweight and the second main journal bearing being arranged adjacent to the second counterweight such that the main journal bearings sandwich the first and second counterweights. A first main journal bearing notch is shaped to receive hydraulic fluid from a first passage connecting it to a hydraulic fluid source, the first main journal bearing notch directing the hydraulic fluid to or away from the first chamber. A second main journal bearing notch is shaped to receive hydraulic fluid from a second passage connecting it to a hydraulic fluid source, the second main journal bearing notch directing the hydraulic fluid to or away from the second chamber.

Turning now to FIG. 5, it shows a detailed view 500 of a chamber 510 of the crankshaft 40. The chamber 510 may be used similarly to first chamber 212 or second chamber 214. In one example, if the chamber 510 is exactly identical to the first chamber 212, then a mirror image of chamber 510 is exactly identical to second chamber 214.

That is to say, chamber 510 is illustrated having a single opening 512 arranged at one extreme end of its arc, wherein the opening 512 may flow hydraulic fluid to and receive hydraulic fluid from an internal passage, such as first or second internal passages 312, 314 of FIGS. 3 and 4. As described above, the internal passage may be fluidly coupled to a notch of a main journal bearing.

Arrow 514 indicates a direction of hydraulic fluid flow when the chamber 510 is being at least partially filled with hydraulic fluid. Arrow 516 indicates a direction of hydraulic fluid flow when the chamber 510 is being at least partially emptied. Thus, a feature of an eccentric ring of the eccentric rings 410 of FIG. 4 may be rotated in a clockwise direction with arrow 514 when the chamber 510 is filled. As will be described below, the eccentric ring may comprise another of the feature with may communicate with a different, complementary hydraulic chamber which may rotate the eccentric ring in a counterclockwise direction. In one example, if the chamber 510 is the first chamber, then as hydraulic fluid flows out of the first chamber, the hydraulic fluid may enter a second complementary chamber shaped to rotate the eccentric ring in a different, opposite direction.

Turning now to FIGS. 6A, 6B, 6C, and 6D, they show a perspective view 600, a top view 625, a front view 650, and a side-on view 675, respectively, of an eccentric ring 610. Eccentric ring 610 may be used similarly to any of eccentric rings 410 of FIG. 4.

Turning now to FIG. 6A, the perspective view 600 shows outer walls 612 sandwiching an elliptical lobe 614. The outer walls 612 may be substantially identical in shape and size. In one example, the outer walls 612 are circular and an axis of rotation (e.g., axis of rotation 292 of FIG. 2) of a crankshaft may pass through a center of the outer walls 612. Additionally or alternatively, the outer walls 612 may be other shapes without departing from the scope of the present disclosure. The outer walls 612 and the lobe 614 each comprise openings for allowing a pipe of the crankshaft to extend through.

The elliptical lobe 614 may be offset with the axis of rotation such that its center and the axis of rotation do not align. Additionally, an orientation of the lobe 614 may be adjusted to adjust a compression ratio of a cylinder. The orientation may be adjusted via a hydraulic fluid pressing against a protrusion 616 of the eccentric ring. As shown, the protrusion 616 is arranged on an outer surface of an outer wall such that the protrusion 616 extends away from the elliptical lobe 614.

Turning now to FIG. 6B, the top view 625 shows the eccentric ring 610 comprising a first protrusion 616A and a second protrusion 616B. The first and second protrusions 616A, 616B being arranged on the outer walls 612 symmetrically. The first and second protrusions 616A, 616B may be fixed to their respective outer walls such that a location of the protrusions does not change relative to a center of the eccentric ring. However, hydraulic fluid in one or more of the first and second chambers may press against the protrusions which may result in the eccentric ring rotating some amount. In one example, the eccentric ring rotates less than 360° in response to the hydraulic fluid in the first and second chambers. In some examples, the eccentric ring rotates less than 180° in response to the hydraulic fluid in the first and second chambers. In some examples, the eccentric ring rotates less than 90° in response to the hydraulic fluid in the first and second chambers. It will be appreciated that the eccentric ring 610 may follow a full revolution based on the crankshaft revolution and that the hydraulic fluid rotating the eccentric ring occurs independently of the crankshaft revolution.

The first and second protrusions 616A, 616B may be substantially identical in size and shape. In one example, the first and second protrusions 616A, 616B may be rectangular-prisms curved to match a curve of the outer walls 612. A cross-section of the first and second protrusions 616A, 616B taken along the axis of rotation may be substantially rectangular.

Turning now to FIG. 6C, it shows a front view 650 of the eccentric ring 610. As shown in the front view, the protrusion 616 may comprise a beveled corner 618, shown in greater detail in FIG. 6D.

Turning now to FIG. 6D, it shows a side-on view 675 of the eccentric ring 610. The first protrusion 616A comprises a first bevel 618A at a first corner and the second protrusion 616B comprises a second bevel 618B at a second corner, wherein the first corner and the second corner are different. In one example, a location of the bevels may correspond to an opening of the first and second chambers. That is to say, the first bevel 618A of the first protrusion 616A may face an opening of the first chamber 212 to prevent a sealing that would otherwise occur if the first corner were not beveled. Similarly, the second bevel 618B of the second protrusion 618B may face an opening of the second chamber 214 to prevent a sealing that would otherwise occur if the second corner were not beveled. By beveling a corner that would otherwise close the opening of the chambers, hydraulic fluid may quickly enter a chamber when desired, thus providing prompt adjustment of a compression ratio.

In some examples, additionally or alternatively, the first and second chambers 212, 214 may be arranged on a single counterweight. As such, the first and second protrusions 616A, 616B may be arranged on a single outer wall of the eccentric ring 610. However, the protrusions may be radially mismatched to match the first and second chambers 212, 214.

Turning now to FIGS. 7A and 7B, they show embodiments 700 and 750 of a chamber being filled with hydraulic fluid and emptied of hydraulic fluid, respectively. The embodiments 700 and 750 further illustrate a position of the first protrusion 616A of the protrusions of the eccentric ring 610. Herein, the chamber illustrated in the example of FIG. 7A is the same as the first chamber 212 and the chamber illustrated in the example of FIG. 7B is the second chamber 214. The first chamber 212 comprises an opening 512 fluidly coupling the chamber to the first internal passage 312. As described above, the first internal passage 312 may be coupled to a first notch of a nearest main journal bearing.

Arrows 790 indicate a direction of hydraulic fluid flow relative to the first chamber 212. As shown, hydraulic fluid flows through the first internal passage 312, enters the first chamber 212 via the opening 512 at a first extreme end 702 of the first chamber, and flows toward a second extreme end 704 of the first chamber 212, pushing the protrusion 616A with it. In one example, the position of the protrusion 616A in the first chamber corresponds to a lowest compression state.

Arrow 792 indicates a direction of hydraulic fluid flow relative to the second chamber 214. As shown, hydraulic fluid is pushed out of the second chamber 214 by the second protrusion 616B away from the second extreme end 704 toward the first extreme end 702 where the opening 512 is arranged. The hydraulic fluid flows through the opening 512 and into the second internal passage 314, where the hydraulic fluid may be directed toward a second notch of a nearest main journal bearing.

As shown, each of the first and second chambers 212, 214 are similar in size and shape. In one example, the first and second chambers 212, 214 are arc-shaped with a square or rectangular cross-section taken in a direction perpendicular to a direction of rotation of the chambers. Additionally or alternatively, the first and second chambers 212, 214 may be half-circles or other similar shape. As shown, the first and second chambers 212, 214 are arranged in respective first and second tracks 712, 714 of the first and second counterweights 606A, 606B. Thus, the first protrusion 616A may rotate in the counterclockwise direction shown in the example of FIG. 7A, while a body of the first chamber 212 is rotated in a clockwise direction.

Turning now to FIGS. 8A and 8B, they show a comparison between a low compression state 800 and a high compression state 850. In one example, the low compression state 800 is a lowest compression state and the high compression state 850 is a highest compression state. In one example, the lowest compression state is 8:1 and the highest compression state is 14:1. However, other compression state ratios may be used as the lowest and highest compression states without departing from the scope of the present disclosure. For example, the higher compression state may be 23:1 or greater.

Differences between the low compression state 800 and the high compression state 850 may include an orientation of the eccentric rings 610, illustrated by space 802, and a position of the protrusions 616A and 616B as a result of hydraulic fluid flow. The space 802 may correspond to a difference between TDC and BDC for the low and high compression states. In one example, BDC is lower in the high compression state than in the low compression state and TDC is higher in the high compression state than in the low compression state.

Turning now to FIG. 9, it shows a method 900 for adjusting hydraulic fluid flow to the first and second chambers to adjust a compression ratio of the engine. Instructions for carrying out method 900 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 900 begins at 902, where the method 902 may include determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, compression ratio, and air/fuel ratio.

The method 900 may proceed to 904, which may include determining if a current compression ratio is equal to a desired compression ratio. In some example, the compression ratio may be increased or decreased based on an engine load. In one example, the compression ratio is decreased as an engine load increases. This may increase fuel economy. If the current compression ratio is equal to the desired compression ratio, then the method 900 may proceed to 906, which may include maintaining current engine operating parameters and not adjusting positions of a first valve and a second valve (e.g., first valve 386A and second valve 386B of FIG. 3). As such, hydraulic fluid flows to the first and second chambers may not be adjusted.

If the current compression ratio is not equal to a desired compression ratio, then the method 900 may proceed to 908, which may include determining if a lower compression ratio is desired. If the lower compression ratio is desired, then the method 900 may proceed to 910, which may include moving the first valve to a more open position and moving the second valve to a more closed position.

The method 900 may proceed to 912, which may include flowing hydraulic fluid into the first chamber and out the second chamber. By doing this, more hydraulic fluid from a hydraulic fluid source (e.g., hydraulic fluid source 382 of FIG. 3) may flow into a first hydraulic source passage (e.g., first hydraulic source passage 384A of FIG. 3), through the at least partially open first valve, to a first notch of a first main journal bearing, into a first internal passage (e.g., first internal passage 312 of FIG. 3), and into the first chamber. Furthermore, due to the second valve moving to a more closed position, less hydraulic fluid from the hydraulic fluid source may flow into a second hydraulic source passage (e.g., second hydraulic source passage 384B of FIG. 3), to a second notch of a second main journal bearing, and into a second internal passage (e.g., second internal passage 314 of FIG. 3) and into the second chamber. In this way, the first chamber may move a first protrusion of an eccentric ring (e.g., first protrusion 616A of eccentric ring 610 of FIGS. 6A-6D) in a first direction. Due to the protrusions of the eccentric ring being fixed, a second protrusion (e.g., second protrusion 616B of FIGS. 6A-6D) also moves in the first direction, and thereby forces hydraulic fluid out of the second chamber.

In some examples, additionally or alternatively, the lower compression ratio desired may a lowest compression ratio. As such, the first valve may be moved to a fully open position and the second valve may move to a fully closed position. In this way, the first chamber may be completely filled with hydraulic fluid and the second chamber may be completely emptied of hydraulic fluid.

In some embodiments, additionally or alternatively, once a desired compression ratio is reached, hydraulic fluid flow to and from the first and second chambers is prevented and a volume of hydraulic fluid in each of the chambers is maintained. As such, the first and second valves may move to fully closed positions once the desired compression ratio is reached and may not be moved out of the fully closed positions until a different compression ratio is desired. In such an embodiment, each of the first and second valves may be moved to more open positions in response to a different compression ratio being desired, however, one of the first or second valves may be more opened than the other to adjust the compression ratio.

Returning to 908, if a lower compression ratio is not desired, then the method 900 may proceed to 914, which may include a higher compression ratio being desired. As such, the engine load may have decreased.

The method 900 may proceed to 916, which may include moving the second valve to a more open position and moving the first valve to a more closed position. At 918, the method 900 may include flowing more hydraulic fluid into the second chamber and out the first chamber. As such, hydraulic fluid entering the second chamber may push the second protrusion in a second direction. Similarly, due to the lack of hydraulic fluid in the first chamber pushing the first protrusion in the first direction, the first protrusion may correspondingly move in the second direction.

In some examples, additionally or alternatively, the higher compression ratio desired may be a highest compression ratio. As such, the second valve may be moved to a fully open position and the first valve may be moved to a fully closed position. In this way, the second chamber may be completely filled with hydraulic fluid and the first chamber may be completely emptied of hydraulic fluid.

In this way, an easy-to-manufacture crankshaft may be arranged in an engine, where the crankshaft comprises a complementary chambers surrounding an eccentric ring. The chambers may receive an amount of hydraulic fluid based on a desired compression ratio to adjust an orientation of the eccentric ring. The technical effect of utilizing hydraulic chambers to adjust a compression ratio is to decrease manufacturing costs as hydraulic fluid (e.g., oil) is readily available in an engine block and increase durability. The hydraulic fluid flow to the chambers may be adjusted by a single valve or by a plurality of valves, wherein the valves may be mechanically or electronically actuated. Thus, if degradation were to occur, repair and/or replacement of the valve(s) is relatively simple and cheap compared to the previous example described above.

An embodiment of a system comprises a crankshaft eccentric ring comprising a first protrusion and a second protrusion rotated by hydraulic fluid in a first chamber and a second chamber. A first example of the system further includes where the first hydraulic chamber is a low compression chamber and the second hydraulic chamber is a high compression chamber. A second example of the system, optionally including the first example, further includes where the eccentric ring is sandwiched between a first counterweight and a second counterweight, and where the first chamber is arranged in the first counterweight and the second chamber is arranged in the second counterweight. A third example of the system, optionally including the first and/or second examples, further includes where the first protrusion contacts only hydraulic fluid in the first chamber and where the second protrusion contact only hydraulic fluid in the second chamber. A fourth example of the system, optionally including one or more of the first through third examples, further includes where hydraulic fluid flow to and from the first and second chambers is proportional, wherein an amount of hydraulic fluid flowing into the first chamber is equal to an amount of hydraulic fluid flowing out of the second chamber or vice-versa. A fifth example of the system, optionally including one or more of the first through fourth examples, further includes where the first and second chambers are identical in size and shape, and where the first and second chambers comprise first and second extreme ends in identical locations, and where the first chamber comprises a first chamber opening adjacent the first extreme end and where the second chamber comprises a second chamber opening adjacent the second extreme end. A sixth example of the system, optionally including one or more of the first through fifth examples, further includes where the first protrusion and the second protrusion are rectangular prism shaped, and where an edge of the first protrusion nearest the first chamber opening is beveled, and where an edge of the second protrusion nearest the second chamber opening is beveled. A seventh example of the system, optionally including one or more of the first through sixth examples, further includes where there are no other inlets or additional outlets in the first and second chambers other than the first and second openings. An eighth example of the system, optionally including one or more of the first through seventh examples, further includes where the first and second chambers are arc-shaped.

An embodiment of an engine block comprises a hydraulic fluid source fluidly coupled to a first main journal bearing notch and to a second main journal bearing notch arranged on a first main journal bearing and a second main journal bearing, respectively, arranged on a crankshaft, a first internal passage fluidly coupling the first main journal bearing notch to a first chamber arranged in a first counterweight, and a second internal passage fluidly coupled the second main journal bearing notch to a second chamber arranged in a second counterweight, and an eccentric ring arranged between the first and second counterweights comprising a first protrusion arranged in the first chamber and a second protrusion arranged in the second chamber. A first example of the engine block further comprises where hydraulic fluid in the first chamber orients the eccentric ring in a first position and where hydraulic fluid in the second chamber orients the eccentric ring in a second position. A second example of the engine block, optionally including the first example, further includes where the first position is a lowest compression ratio position, and where the lowest compression ratio position comprises the first chamber being full of hydraulic fluid and the second chamber being void of hydraulic fluid, and where the second position is a highest compression ratio position, and where the highest compression ratio position comprises the second chamber being full of hydraulic fluid and the first chamber being void of hydraulic fluid, and where the eccentric ring further comprises a plurality of compression ratio positions between the lowest compression ratio and highest compression ratio positions, and where the plurality of compression ratio positions comprise some amount of hydraulic fluid being in each of the first chamber and the second chamber. A third example of the engine block, optionally including the first and/or second examples, further includes where the first main journal bearing is in face-sharing contact with the first counterweight and where the second main journal bearing is in face-sharing contact with the second counterweight, and where the first and second counterweights are sandwiched between the first and second main journal bearings. A fourth example of the engine block, optionally including one or more of the first through third examples, further includes where the eccentric ring, first and second chambers, first and second counterweights, and first and second main journal bearings are a first variable compression actuation set, and where the crankshaft comprises a plurality of variable compression actuation sets, wherein a number of the plurality of variable compression actuation sets is equal to a number of cylinders arranged in an engine. A fifth example of the engine block, optionally including one or more of the first through fourth examples, further includes where the eccentric ring may rotate based on input from the crankshaft and hydraulic fluid in the first and second chambers, and where a rotation of the eccentric ring in response to the crankshaft is independent of a rotation of the eccentric ring in response to the hydraulic fluid in the first and second chambers.

An embodiment of a method comprises adjusting a compression ratio of an engine via adjusting a flow of hydraulic fluid to and from a first chamber and a second chamber shaped to adjust an orientation of an eccentric ring arranged therebetween, the eccentric ring comprising first and second protrusions protruding into the first and second chambers, respectively. A first example of the method further includes where flowing a maximum amount of hydraulic fluid to the first chamber and emptying the second chamber in response to a lowest compression ratio being desired, and where orienting the eccentric ring in a lowest compression ratio orientation further comprises rotating the eccentric ring in a first direction. A second example of the method, optionally including the first example, further includes where flowing the maximum amount of hydraulic fluid to the second chamber and emptying the first chamber in response to a highest compression ratio being desired, and where orienting the eccentric ring in a highest compression ratio orientation further comprises rotating the eccentric ring in a second direction opposite the first direction. A third example of the method, optionally including the first and/or second examples, further includes where orienting the eccentric ring in an orientation corresponding to a compression ratio between the highest and the lowest compression ratios via adjusting an amount of hydraulic fluid in each of the first and second chambers, and where the first chamber comprises more hydraulic fluid than the second chamber for an orientation of the eccentric ring corresponding to a lower compression ratio, and where the second chamber comprises more hydraulic fluid than the first chamber for an orientation of the eccentric ring corresponding to a higher compression ratio, where the higher compression ratio is more similar to the highest compression ratio than the lower compression ratio. A fourth example of the method, optionally including one or more of the first through third examples, further includes where adjusting the flow of hydraulic fluid to and from the first chamber and the second chamber includes actuating a valve, wherein the valve is a spool valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
   a crankshaft; and
   a crankshaft eccentric ring comprising a first protrusion and a second protrusion, the first protrusion and the second protrusion arranged on opposite sides of the crankshaft eccentric ring and rotated by hydraulic fluid in one or more of a first chamber and a second chamber, wherein the first chamber is formed within a first counterweight and is sized to receive the first protrusion, and the second chamber is formed within a second counterweight and is sized to receive the second protrusion.

2. The system of claim 1, wherein the first chamber is a low compression chamber and the second chamber is a high compression chamber.

3. The system of claim 1, wherein the crankshaft eccentric ring is sandwiched between the first counterweight and the second counterweight.

4. The system of claim 1, wherein the first protrusion only contacts hydraulic fluid in the first chamber, and the second protrusion only contacts hydraulic fluid in the second chamber.

5. The system of claim 1, wherein hydraulic fluid flow to and from the first and second chambers is proportional, such that an amount of hydraulic fluid flowing into the first chamber is equal to an amount of hydraulic fluid flowing out of the second chamber or vice-versa.

6. The system of claim 1, wherein the first and second chambers are identical in size and shape, and where the first chamber comprises a first chamber opening adjacent an extreme end of the first chamber, and where the second chamber comprises a second chamber opening adjacent an extreme end of the second chamber.

7. The system of claim 6, wherein the first protrusion and the second protrusion are rectangular prism shaped, and where an edge of the first protrusion nearest the first chamber opening is beveled, and where an edge of the second protrusion nearest the second chamber opening is beveled.

8. The system of claim 6, wherein the first and second protrusions are formed as substantially rectangular prisms and curved so as to match a curve of respective outer walls of the crankshaft eccentric ring.

9. The system of claim 1, wherein the first and second chambers are arc-shaped.

10. An engine block comprising:
    a hydraulic fluid source fluidly coupled to a first main journal bearing notch and to a second main journal bearing notch arranged on a first main journal bearing and a second main journal bearing, arranged on a crankshaft, respectively;

a first internal passage fluidly coupling the first main journal bearing notch to a first chamber formed within a first counterweight, and a second internal fluid passage fluidly coupling the second main journal bearing notch to a second chamber formed within a second counterweight; and an eccentric ring arranged between the first and second counterweights, the eccentric ring comprising a first protrusion and a second protrusion, the first protrusion and the second protrusion arranged on opposite sides of the crankshaft eccentric ring, such that the first protrusion extends into the first chamber formed within the first counterweight, and the second protrusion extends into the second chamber formed within the second counterweight.

11. The engine block of claim 10, wherein hydraulic fluid in the first chamber orients the eccentric ring to a first position and where hydraulic fluid in the second chamber orients the eccentric ring to a second position.

12. The engine block of claim 11, wherein the first position is a lowest compression ratio position, and where the lowest compression ratio position comprises the first chamber being full of hydraulic fluid and the second chamber being void of hydraulic fluid, and where the second position is a highest compression ratio position, and where the highest compression ratio position comprises the second chamber being full of hydraulic fluid and the first chamber being void of hydraulic fluid, and where the eccentric ring further comprises a plurality of compression ratio positions between the lowest compression ratio and highest compression ratio positions, and where the plurality of compression ratio positions comprise each of the first chamber and the second chamber being neither full of hydraulic fluid nor void of hydraulic fluid.

13. The engine block of claim 10, wherein the first main journal bearing is in face-sharing contact with the first counterweight and the second main journal bearing is in face-sharing contact with the second counterweight, and where the first and second counterweights are between the first and second main journal bearings.

14. The engine block of claim 10, wherein the eccentric ring, first and second chambers, first and second counterweights, and first and second main journal bearings are a first variable compression actuation set, and where the crankshaft comprises a plurality of variable compression actuation sets, wherein a number of the plurality of variable compression actuation sets is equal to a number of cylinders arranged in the engine block.

15. The engine block of claim 10, wherein the eccentric ring may rotate based on input from the crankshaft and hydraulic fluid in the first and second chambers, and where a rotation of the eccentric ring in response to the input from the crankshaft is independent of a rotation of the eccentric ring in response to the input from hydraulic fluid in the first and second chambers.

16. A method comprising:

adjusting a compression ratio of an engine via adjusting a flow of hydraulic fluid for a crankshaft to and from a first chamber formed within a first counterweight and a second chamber formed within a second counterweight, the first and second chambers shaped to adjust an orientation of an eccentric ring arranged therebetween, the eccentric ring comprising first and second protrusions arranged on opposite sides of the eccentric ring, such that the first chamber is sized to receive the first protrusion, and the second chamber is sized to receive the second protrusion.

17. The method of claim 16, further comprising flowing a maximum amount of hydraulic fluid to the first chamber and emptying the second chamber in response to a lowest compression ratio being desired, and where orienting the eccentric ring in a lowest compression ratio orientation further comprises rotating the eccentric ring in a first direction.

18. The method of claim 17, further comprising flowing the maximum amount of hydraulic fluid to the second chamber and emptying the first chamber in response to a highest compression ratio being desired, and where orienting the eccentric ring in a highest compression ratio orientation further comprises rotating the eccentric ring in a second direction opposite the first direction.

19. The method of claim 18, further comprising orienting the eccentric ring in an orientation corresponding to a compression ratio between the highest and the lowest compression ratios via adjusting an amount of hydraulic fluid in each of the first and second chambers, and where the first chamber comprises more hydraulic fluid than the second chamber for an orientation of the eccentric ring corresponding to a lower compression ratio, and where the second chamber comprises more hydraulic fluid than the first chamber for an orientation of the eccentric ring corresponding to a higher compression ratio, where the higher compression ratio is closer to the highest compression ratio than the lower compression ratio.

20. The method of claim 18, wherein adjusting the flow of hydraulic fluid to and from the first chamber and the second chamber includes actuating a valve, wherein the valve is a spool valve.

* * * * *